United States Patent [19]
Charlsworth

[11] 3,740,445
[45] June 19, 1973

[54] ELECTRODE ASSEMBLIES
[75] Inventor: Donald Charlsworth, Cuddington, England
[73] Assignee: Pilkington Brothers Limited, Liverpool, England
[22] Filed: Apr. 12, 1972
[21] Appl. No.: 243,372

[30] Foreign Application Priority Data
Apr. 16, 1971  Great Britain..................... 9,691/71

[52] U.S. Cl........................................... 13/6, 13/17
[51] Int. Cl.............................................. C03b 5/02
[58] Field of Search...................... 13/6, 17, 14–16

[56] References Cited
UNITED STATES PATENTS
3,327,040   6/1967   Molstedt et al.................... 13/6 UX
3,148,239   9/1964   Pinotti..................................... 13/6
3,634,588   1/1972   Steitz et al............................... 13/6

Primary Examiner—Roy N. Envall, Jr.
Attorney—Richard C. Sughrue, Gideon Franklin Rothwell, John H. Mion et al.

[57] ABSTRACT

An electrode assembly for insertion in a wall of a glass melting furnace comprises cooling means surrounding the electrode where it passes through the furnace wall, an insulating refractory sleeve surrounding the cooling means and further cooling means surrounding the insulating sleeve. Cooling of the insulating sleeve maintains it at a high resistivity level.

6 Claims, 1 Drawing Figure

PATENTED JUN 19 1973
3,740,445
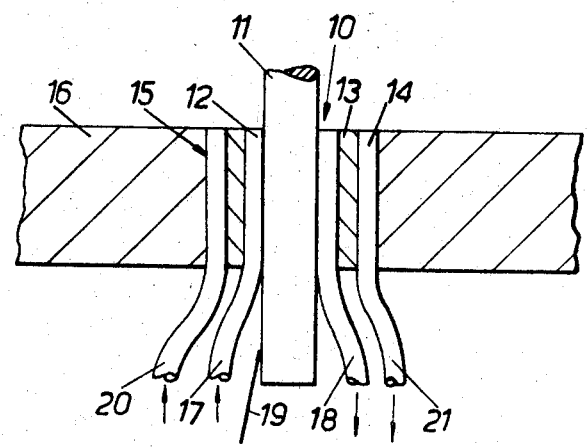

ELECTRODE ASSEMBLIES

BACKGROUND OF THE INVENTION

1. Field of the Invention

The invention relates to electrode assemblies and more particularly to an electrode assembly for use in an electric glass melting furnace.

In electric furnaces for the melting of glass, current is passed through the molten glass between electrodes which project through the refractory wall of the furnace into the molten glass.

2. Description of the Prior Art

With known constructions of electrode assemblies, there is the tendency for electrical leakage paths to develop between the electrodes within the hot refractory material of the furnace wall. The existence of these leakage paths results in accelerated corrosion of the refractory material. This problem is particularly acute during the melting of high resistivity compositions. In such a case, the ratio of refractory resistance to glass resistance is reduced thereby resulting in electrical currents of increased magnitude being passed through the leakage paths.

Further when melting a high resistivity composition, for example E-glass of the kind normally used for the manufacture of continuous glass filaments, the refractory of the furnace walls may be attacked by the glass and it is preferred to employ for the furnace walls refractory materials which are chemically inert to the molten glass even though those refractories do not have the highest desirable resistivity.

It is a main object of the present invention to reduce corrosion of the refractory material by current leakage through the refractory.

SUMMARY

An electrode assembly for insertion in an aperture in a refractory wall of a glass melting furnace, comprises a central electrode and a sleeve of refractory material surrounding and spaced from the electrode over the part of its length within said furnace wall. The material of said sleeve, e.g. fused silica, has a higher electrical resistivity than that of the refractory furnace wall. Cooling means are disposed between the electrode and the sleeve, and between the sleeve and the refractory furnace wall to cool the sleeve and thereby maintain it at as high an electrical resistivity as possible.

BRIEF DESCRIPTION OF THE DRAWINGS

The FIGURE is a diagrammatic longitudinal section through an electrode assembly according to the invention mounted in the bottom wall of an electric glass melting furnace.

DESCRIPTION OF THE PREFERRED EMBODIMENTS

Referring to the drawing, an electrode assembly 10 comprises a centrally disposed electrode 11 of circular cross-section. The electrode 11 is made for example of molybdenum, carbon, which may be in the form of graphite, or tin oxide, and is closely enclosed within a first annular water jacket 12 connected at one end to inlet and outlet water feed pipes 17, 18 respectively to provide continuous circulation of water through the water jacket. This water jacket 12 is surrounded by an annular sleeve 13 of refractory mateial which is itself closely surrounded by a second annular water jacket 14 connected to water feed pipes 20, 21. This second water jacket 14 is electrically isolated from the first water jacket 12. Moreover, in this example, each water circulation system is a closed circuit including its own pump and cooling means. These closed circuits assist in ensuring the necessary electrical isolation of the two systems. Moreover, closed circuit systems possess reduced scaling and corrosion problems than mains fed circulation systems.

The whole assembly is fitted in a circular aperture 15 in the bottom refractory wall 16 on an electric glass melting furnace, the electrode 11 projecting upwardly into the furnace and the molten glass therein and also downwardly, i.e. outwardly of the furnace, for connection to electrical supply means 19. It will be seen from the drawing that, at least in this example, the innermost ends of the water jackets 12, 14 and the intermediate refractory sleeve 13 are co-planar with the inner surface of the furnace bottom wall 16.

Also, in this example, the length of the refractory sleeve 13 is equal to the thickness of the bottom wall 16. Conveniently, the sleeve 13 comprises a tube 12 inches long and having an internal diameter of between 4 inches and 5 inches and a wall thickness of 1 inch.

The refractory material of the sleeve 13 has a higher electrical resistivity than the refractory material of the bottom wall 16 of the furnace, and in this example is formed of fused silica. The resistivity of the silica sleeve 13 is maintained at a high level by the cooling effect of the water jackets 12, 14, the resistivity increasing with a decrease in temperature, and thus efficiency of cooling is enhanced by the fact that the sleeve is cooled both internally by the first water jacket 12 and externally by the second water jacket 14.

It has been found that with the combination of the inner and outer water jackets 12, 14 it is possible to increase the specific resistivity of the fused silica sleeve 13 to a value at least five orders of magnitude greater than the specific resistivity of the molten glass, thereby providing a high degree of electrode isolation.

The selection of fused silica for the material of the electrode isolating sleeve 13 is also beneficial in view of the high resistance of this material to corrosion and thermal shock.

This maintenance of the electrical resistivity of the sleeve 13 at a high level, serves to reduce the electrical leakage paths which would otherwise develop within the hot refractory of the bottom wall 16, and consequently to reduce generation of heat within the wall 16 together with the associated accelerated corrosion of the refractory wall. Moreover, it also reduces the associated corrosive high speed circulation of the molten glass in the vicinity of the refractory wall.

Furthermore, the cooling effect of the water jackets 12, 14 results in a local stiffening of the molten glass and so reduces any other corrosion caused by circulation of the molten glass, as well as retarding any leakage of glass downwardly through the joints between the components of the electrode assembly and between the assembly and the bottom wall of the furnace.

It has been found that during use of the electrode assembly 10 described above, the molten glass nearest the upper surface of the assembly will tend to solidify thereby protecting the assembly from corrosion. In order to adjust the position of the electrode 11 longitudinally relative to the remainder of the electrode assembly, the glass which has solidified is first melted by shutting off the feed to the water jackets 12, 14. The electrode 11 may then be moved further into or out of the furnace.

An electrode assembly described above may be fitted into an aperture of a side wall of a glass melting furnace.

Also, the refractory sleeve may be formed of other material having a low coefficient of thermal expansion and a high electrical resistivity. For example, the sleeve may be formed of zirconia or mullite.

The use of this arrangement of cooled refractory sleeve surrounding the electrode avoids severe corrosion, which would otherwise occur, of the electrodes and the tank wall at the electrode/tank wall interface. Such corrosion has resulted from current flowing from the region of the electrode bounded by the tank wall, through part of the tank wall and the molten glass to another electrode which is in contact with the molten glass.

In another embodiment of the invention the water jackets 12 and 14 are each replaced by a two-start thread waterway. The first of these is positioned annularly around the electrode 11 in place of the jacket 12. The refractory sleeve 13 is then fitted over the first waterway and a second waterway is positioned annularly around the sleeve 13 in place of the jacket 14. This second waterway fits tightly into the aperture 15 in the refractory wall 16. Using this arrangement there is enhanced cooling of the whole of the refractory sleeve 13.

I claim:

1. An electrode assembly for insertion in an aperture in a refractory wall of glass melting furnace, comprising a central electrode, first cooling means closely enclosing the electrode over the part of its length to be located within said furnace wall, a sleeve of refractory material having a higher electrical resistivity than that of said refractory furnace wall, closely surrounding said first cooling means, and second cooling means closely surrounding said sleeve of refractory material and having outer dimensions for fitting in an aperture in the refractory furnace wall, said first and second cooling means being electrically isolated from each other and being effective in use through close contact with both the inner and outer surfaces of the sleeve, to maintain the specific resistivity of the refractory material of the sleeve at least five orders of magnitude greater than the specific resistivity of the molten glass in the furnace.

2. An electrode assembly according to claim 1, wherein each said cooling means comprises a water jacket connected to a closed circuit water feed individual thereto.

3. An electrode assembly according to claim 1, wherein said electrode is of circular cross-section, and both said cooling means and said intermediate refractory sleeve are annular and are coaxial with the electrode.

4. An electrode assembly according to claim 1, wherein said sleeve is formed of fused silica.

5. An electrode assembly according to claim 1, fitted into an aperture in a refractory wall of a glass melting furnace, wherein one end of the electrode projects longitudinally beyond the remainder of the assembly into the furnace, and the other end of the electrode is connected to electrical supply means.

6. An assembly according to claim 5, wherein the electrode is fitted into the bottom wall of the furnace.

* * * * *